US012763504B2

(12) United States Patent
Qiao et al.

(10) Patent No.: US 12,763,504 B2
(45) Date of Patent: Oct. 13, 2026

(54) LOW PROFILE CABLE ASSEMBLY

(71) Applicant: 3M INNOVATIVE PROPERTIES COMPANY, St. Paul, MN (US)

(72) Inventors: YunLong Qiao, Bukit Timah (SG); Saujit Bandhu, Sengkang (SG); Kok Hoe Lee, Geylang (SG); Chin Hua Lim, Mo Kio (SG)

(73) Assignee: 3M Innovative Properties Company, St. Paul, MN (US)

( * ) Notice: Subject to any disclaimer, the term of this patent is extended or adjusted under 35 U.S.C. 154(b) by 294 days.

(21) Appl. No.: 18/564,221

(22) PCT Filed: May 19, 2022

(86) PCT No.: PCT/IB2022/054691

§ 371 (c)(1),
(2) Date: Nov. 27, 2023

(87) PCT Pub. No.: WO2022/248997

PCT Pub. Date: Dec. 1, 2022

(65) Prior Publication Data

US 2024/0250462 A1 Jul. 25, 2024

Related U.S. Application Data

(60) Provisional application No. 63/194,500, filed on May 28, 2021.

(51) Int. Cl.
*H01R 12/79* (2011.01)
*H01R 13/6581* (2011.01)

(52) U.S. Cl.
CPC ......... *H01R 12/79* (2013.01); *H01R 13/6581* (2013.01)

(58) Field of Classification Search
None
See application file for complete search history.

(56) References Cited

U.S. PATENT DOCUMENTS 9,854,679 B2 12/2017 Regnier
10,103,453 B2 * 10/2018 Pao ........................ H01R 12/53
(Continued)

FOREIGN PATENT DOCUMENTS

JP 2017511576 A 4/2017
WO 2020076785 A1 4/2020
(Continued)

OTHER PUBLICATIONS

International Search Report for PCT International Application No. PCT/IB2022/054691, mailed on Aug. 30, 2022, 3 pages.

*Primary Examiner* — Ross N Gushi
(74) *Attorney, Agent, or Firm* — Jonathan L. Tolstedt

(57) ABSTRACT

A cable assembly is disclosed. The cable assembly includes a first cable including a first conductor and a first insulator, a second cable including a second conductor and a second insulator, and a printed circuit board (PCB). A PCB first cable pad is disposed on the PCB, and the first conductor is in electrical communication with the PCB first cable pad. A PCB second cable pad is disposed on the PCB, and the second conductor is in electrical communication with the PCB second cable pad. The first conductor and first insulator each bend at least 30 degrees proximate the PCB first cable pad, the second conductor bends at least 30 degrees proximate the PCB second cable pad, and the second insulator bends proximate the PCB second cable pad less than the second conductor does proximate the PCB second cable pad.

19 Claims, 5 Drawing Sheets

(56) References Cited

U.S. PATENT DOCUMENTS

| | | | | |
|---|---|---|---|---|
| 10,741,941 | B2 * | 8/2020 | Wu .................... | H01R 43/0256 |
| 2017/0181285 | A1 | 6/2017 | Regnier | |
| 2017/0294721 | A1 | 10/2017 | Pao | |
| 2018/0040987 | A1 | 2/2018 | Marowsky et al. | |
| 2018/0261936 | A1 | 9/2018 | Kawate | |
| 2019/0140374 | A1 | 5/2019 | Wu | |
| 2020/0161781 | A1 * | 5/2020 | Qiao ...................... | H01R 12/50 |
| 2020/0328549 | A1 | 10/2020 | Pape | |
| 2021/0050694 | A1 | 2/2021 | Dong et al. | |
| 2021/0159619 | A1 | 5/2021 | Qiao | |

FOREIGN PATENT DOCUMENTS

| | | | |
|---|---|---|---|
| WO | 2020201931 | A1 | 10/2020 |
| WO | 2021101953 | A1 | 5/2021 |

* cited by examiner

LOW PROFILE CABLE ASSEMBLY

CROSS REFERENCE TO RELATED APPLICATIONS

This application is a national stage filing under 35 U.S.C. 371 of PCT/IB2022/054691, filed May 19, 2022, which claims the benefit of U.S. Provisional Application No. 63/194,500, filed May 28, 2021, the disclosures of which are incorporated by reference in their entireties herein.

BACKGROUND

Servers in data centers have ever-increasing data rates. Improved and standardized connectors offer superior mechanical performance, electrical performance, and cost characteristics over current PCB cable assemblies

SUMMARY

In some aspects of the present disclosure, a cable assembly is disclosed. The cable assembly can include a first cable including a first conductor and a first insulator, a second cable including a second conductor and a second insulator, and a printed circuit board (PCB). A PCB first cable pad can be disposed on the PCB, and the first conductor can be in electrical communication with the PCB first cable pad. A PCB second cable pad can be disposed on the PCB, and the second conductor can be in electrical communication with the PCB second cable pad. The first conductor and first insulator can each bend at least 30 degrees proximate the PCB first cable pad, the second conductor can bend at least 30 degrees proximate the PCB second cable pad, and the second insulator can bend proximate the PCB second cable pad less than the second conductor does proximate the PCB second cable pad.

In some aspects of the present disclosure, a cable assembly is disclosed. The cable assembly can include a first cable including a first conductor and a first insulator, a second cable including a second conductor and a second insulator, and a printed circuit board (PCB). A PCB first cable pad can be disposed on the PCB, and the first conductor can be in electrical communication with the PCB first cable pad. A PCB second cable pad can be disposed on the PCB, and the second conductor can be in electrical communication with the PCB second cable pad. An electrical insulation layer can be disposed between the first cable and the second cable, and an electrically conductive shield can be disposed between the first cable and the second cable.

DETAILED DESCRIPTION

Figure 1:
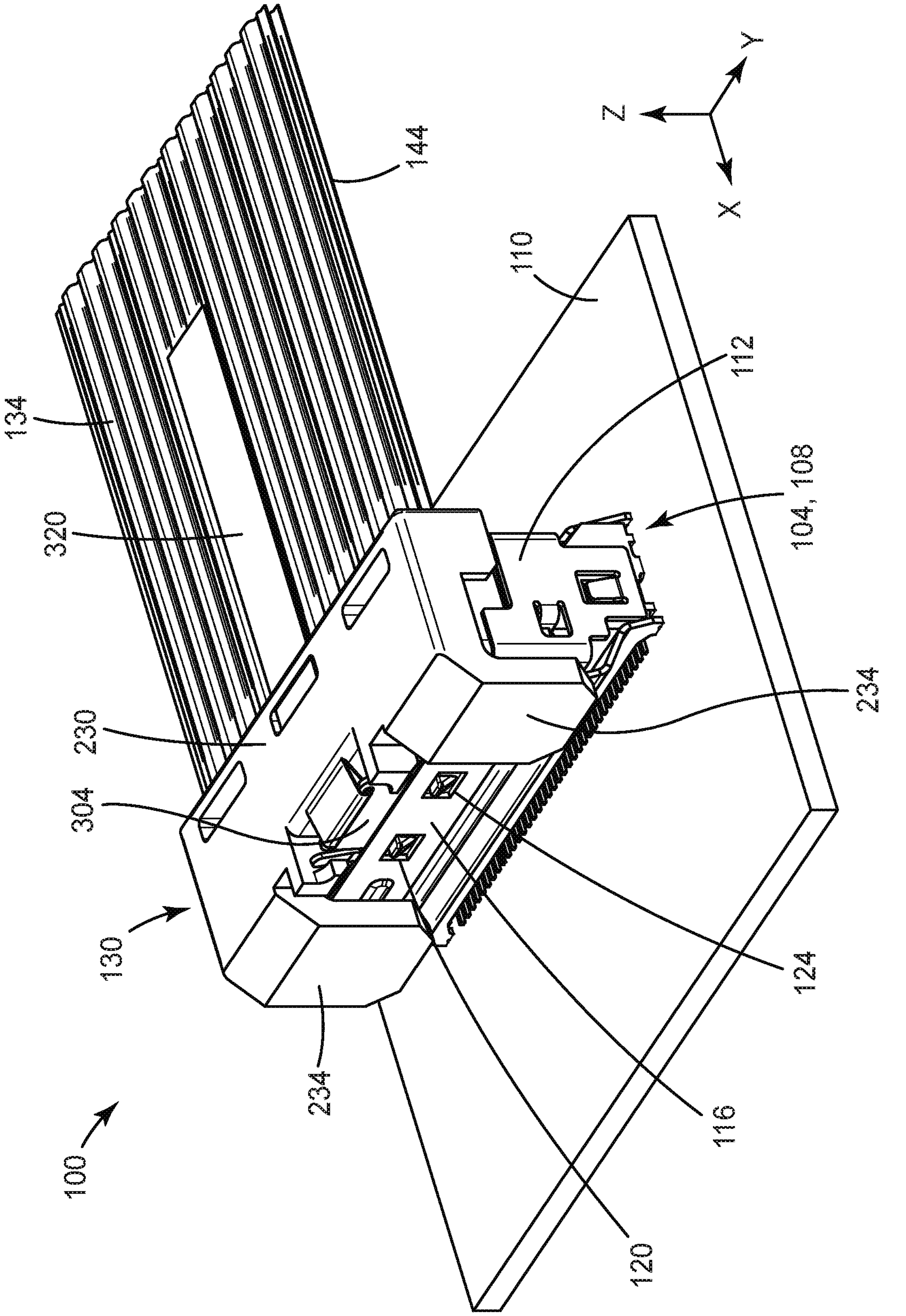
FIG. 1 is an upper perspective view of a connector system, showing a mating connector and a cable assembly in an attached position, according to exemplary embodiments of the present disclosure.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure. Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on." "directly connected to," "directly coupled with," or "directly in contact with" another element, there are no intervening elements, components or layers for example.

As used herein, "have", "having", "include", "including", "comprise", "comprising" or the like are used in their open-ended sense, and generally mean "including, but not limited to." It will be understood that the terms "consisting of" and "consisting essentially of" are subsumed in the term "comprising." and the like.

The data center industry has created several data center consortiums in recent years to offer standardized data products and to encourage data/computer sever suppliers to build servers with higher data rates. Common printed circuit board (PCB) and cabling materials available today require improvements as data rates continue to increase. As a result, special high-performance materials are being developed, but these materials can be costly. For some applications, a costly repeater/retimer component may be necessary when using common PCB materials to improve signal quality over long circuit traces, connectors, and cables. Twinaxial cables, or "Twinax", may be used to eliminate or minimize the need for costly PCB materials and repeater/retimers. A Mini Cool Edge IO (MCIO) application can be designed to work with a number of interfaces, and improved interface designs for a cable assembly and/or a mating connector can enhance connection security, mechanical rigidity, and ease of manual connection or disconnection. Disclosed embodiments of cable assemblies can be used in next generation server applications which support PCIe Gen4/Gen5 protocols and speeds. Also desirable is a low profile cable assembly arrangement where the cable assembly height (when connected to a board mount connector) from a PCB is reduced, while still ensuring excellent electrical and physical performance. Such technologies can relate to Slimline products, such as standard Slimline, 24 mm mini Slimline, LPIO, and MCIO paddle-card interfaces, etc.

Figure 2:
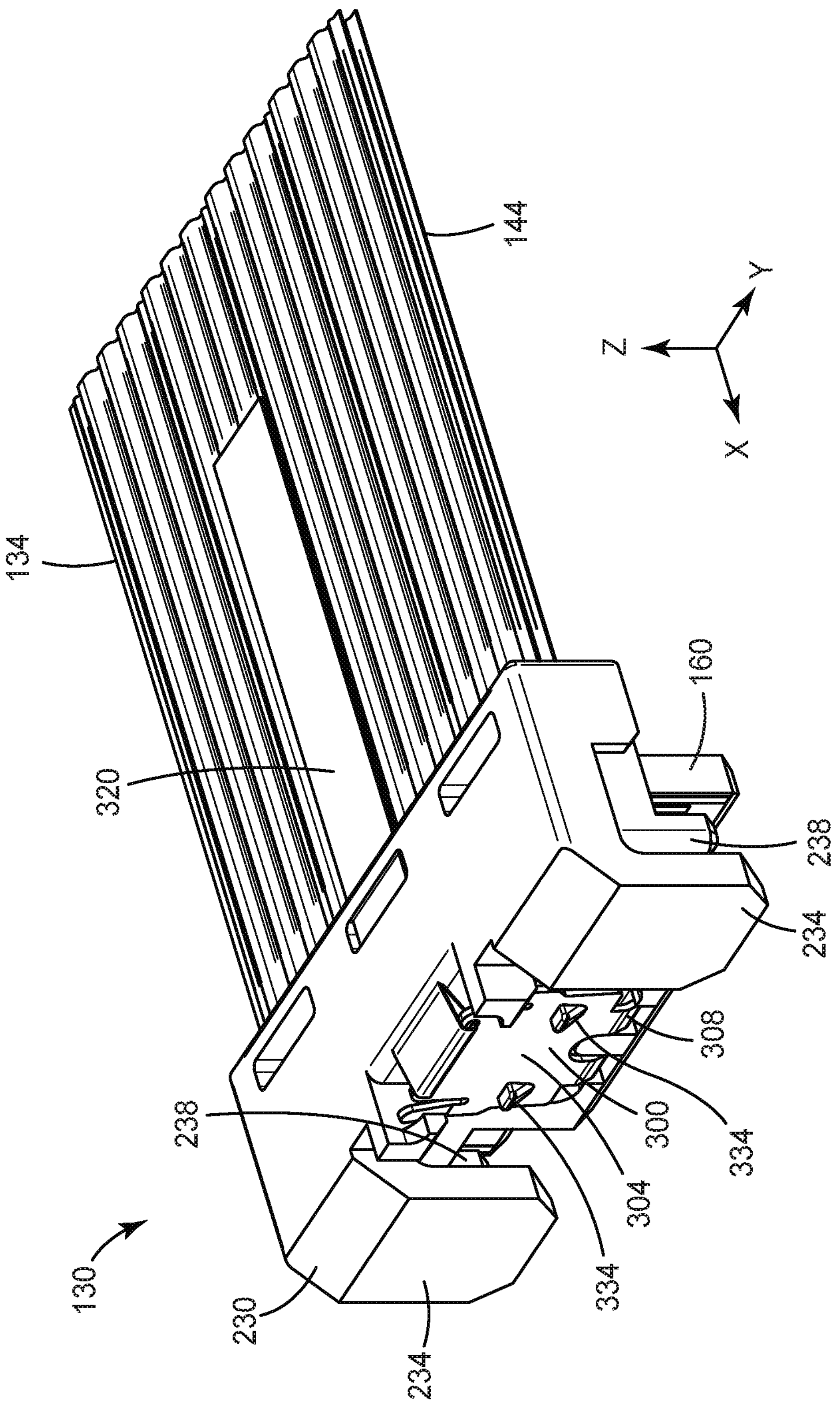
FIG. 2 is an upper perspective view of a cable assembly, according to exemplary embodiments of the present disclosure.
Figure 3:
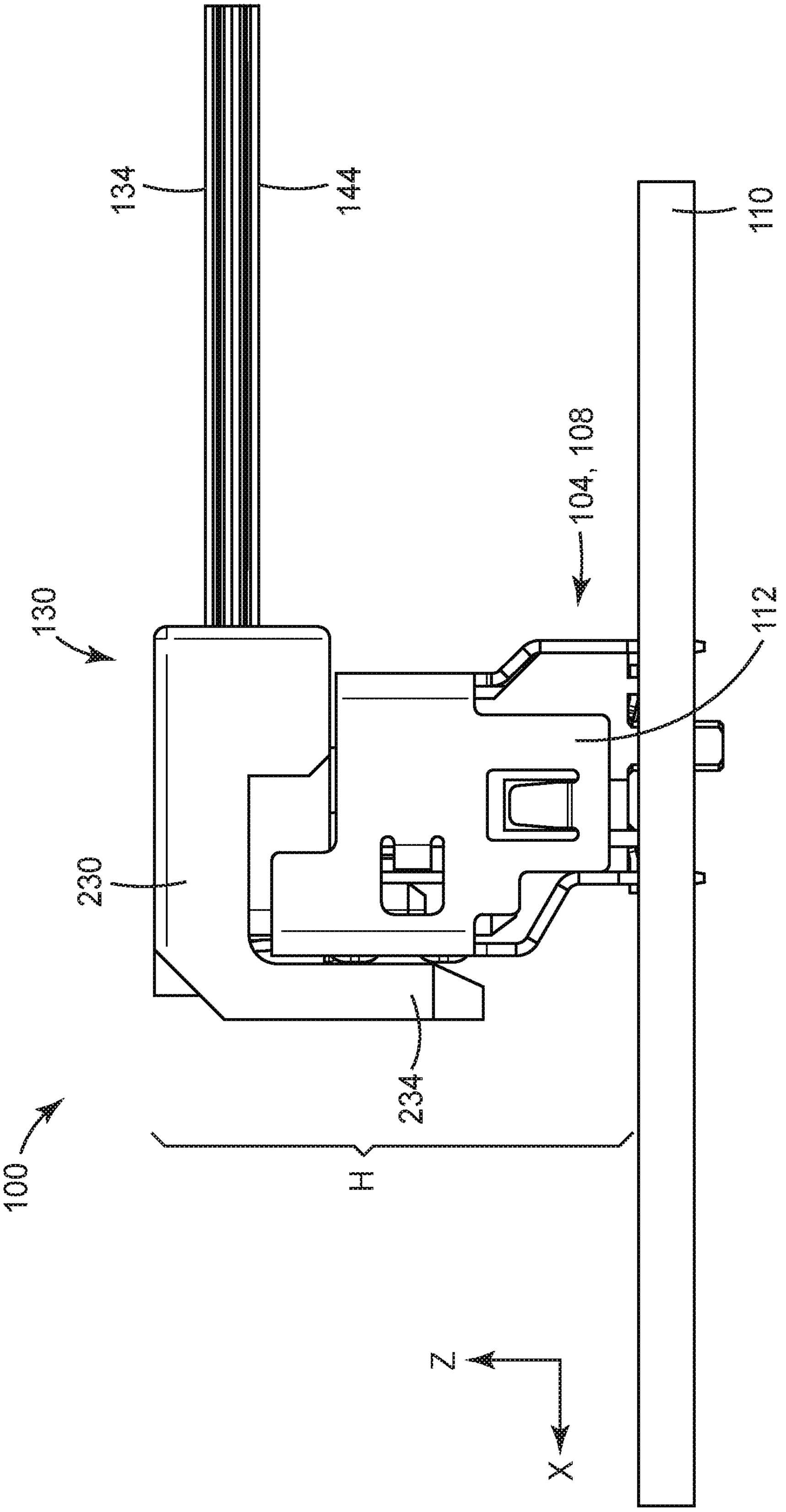
FIG. 3 is a side elevation view of a connector system according to exemplary embodiments of the present disclosure.

Turning to the figures, FIG. 1 is an upper perspective view of a connector system, showing a mating connector and a cable assembly in an attached position, FIG. 2 is an upper perspective view of a cable assembly, and FIG. 3 is a side elevation view of a connector system according to exemplary embodiments of the present disclosure. Together, the cable assembly 130 and the mating connector 104 can form a connector system 100, and the cable assembly 130 and the mating connector 104 can releasably connect to one another as exemplarily shown in FIG. 1. It is to be understood that the disclosed mating connector 104 and/or board mount connector 108 are shown and described as merely exemplary elements, and that a wide range of mating connectors 104 and/or board mount connectors 108 are within the scope of this disclosure and can connect to the disclosed cable assembly 130 in the manners disclosed and shown. Similarly, it is to be understood that the disclosed cable assembly 130 is shown and described as a merely exemplary element, and that a wide range of cable assemblies 130 are within the scope of this disclosure and can connect to the disclosed mating connector 104 in the manners disclosed and shown.

As exemplarily shown in FIGS. 1-3, among others, the mating connector 104 (which can also be a board mount connector 108) can include a cage 112 and a latching portion 116. The latching portion 116 can be formed on the cage 112 or on another portion of the mating connector 104. The latching portion 116 can include one or more mating connector latching features 120. The mating connector latching feature 120 can be an aperture 124, a cavity, protrusion, or a particular shape on the latching portion 116. The cage 112 and/or latching portion 116 can provide structural support for engagement and securement and can also provide an engagement interface for the mating connector 104.

The cable assembly 130 can include one or more first cables 134, one or more second cables 144, and a Printed Circuit Board (PCB) 160. The first and/or second cables 134, 144 can be Twinax cables and can be parallel to, or substantially parallel to, one another. As can be seen in the figures, an X direction can be orthogonal to a Y direction, and each of the X direction and the Y direction can be orthogonal to a Z direction. For clarity, moving rearwardly along the X direction can indicate moving from the overmold 230 along the cables 134, 144 or pull 320 towards the upper-right in FIGS. 1 and 2, while moving forwardly along the X direction can indicate the opposite direction. Further, moving upwardly along the Z direction can indicate moving upward vertically, as shown in FIGS. 1 and 2, while moving downwardly along the Z direction can indicate the opposite direction. Moving to the lower right from the upper left, along the overmold 230 and/or perpendicular to the direction of the cables 134, 144, from the perspective of FIGS. 1 and 2, can indicate moving forwardly in the Y direction, whereas moving in the opposite direction can indicate moving rearwardly in the Y direction.

The cable assembly 130 can include an overmold 230, which can also be termed a main body or a housing. The overmold 230 can be proximate and/or in contact with the PCB 160 and, in some embodiments, can circumscribe, encapsulate, partially circumscribe, or partially encapsulate a portion of the PCB 160. The overmold 230 can include electrically insulating, or substantially insulating, materials such as, but not limited to, polymers, rubbers, ceramics, organic materials, and carbon. As can be seen in the figures, the overmold 230 can define and include a variety of shapes and features. In some embodiments, such as those shown in FIGS. 2 and 4, the overmold 230 can include one or more outer guides or projections 234 and one or more inner guides 238. These guides 234, 238 can extend from the housing 230 along the Z axis and can attach to various portions of the overmold 230 and/or PCB 160. The guides 234, 238 can help to facilitate the initial and continued connection between the mating connector 104 and the cable assembly 130.

A latch 300 and a pull 320 are exemplarily shown in FIGS. 1 and 2. The pull 320 can include a flexible material, such as a polymer, fabric, braided cable, string, organic material, or any other suitable material known to those skilled in the art. In various embodiments, the pull 320 can extend rearwardly along the X axis from the overmold 230 and can further be disposed above, as measured along the Z axis, the cables 134, 144. The latch 300 can include an upper portion 304 and a flexible portion or hinge 308. The upper portion 304 can be disposed forward of, as measured along the X axis, one or both of the flexible portion 172 and other parts of the latch 300. One or more selective securement features 334 can be disposed on the upper portion 304, and thus can move along the X axis and/or the Z axis along with the upper portion 304. The cable assembly 130 can be releasably secured to the mating connector 104 due to the selective securement features 334 engaging with one or more of the mating connector latching feature 120 and the aperture 124 on the latching portion 116. In operation, a user or a machine can pull the pull 320 rearward along the X direction and/or vertically along the Z direction to cause the upper portion 304 to flex (via the flexible portion 308) relative to other portions of the latch 300 and/or overmold 230. When the upper portion 304 flexes and move rearwardly along the X axis, the selective securement features 334 can disengage from the mating connector latching feature 120 and/or aperture 124, thus allowing the cable assembly 130 to selectively disengage from the mating connector 104 along the Z axis and/or the X axis.

Figure 4:
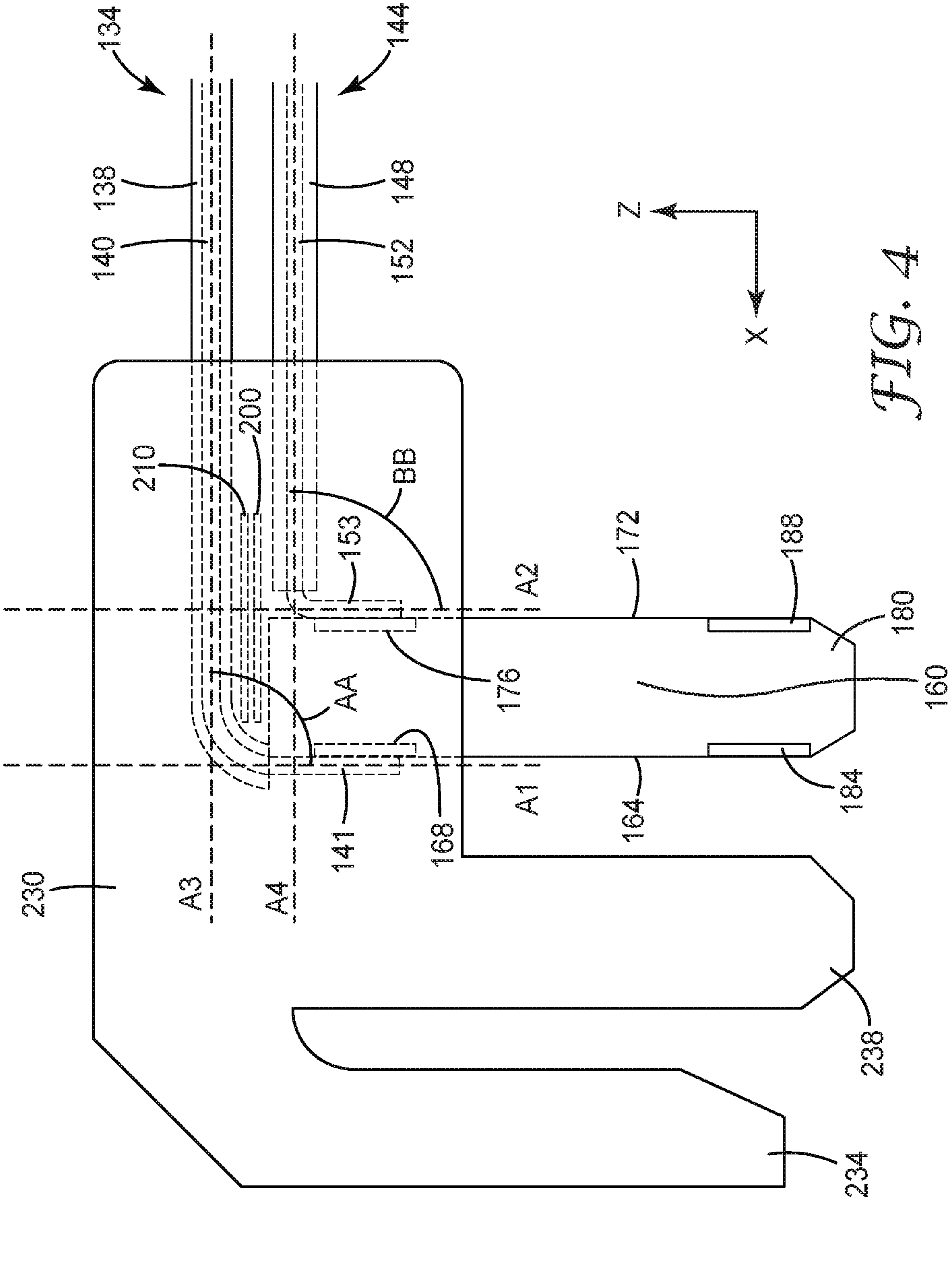
FIG. 4 is a side view of a cable assembly, shown with internal features, according to exemplary embodiments of the present disclosure.
Figure 5:
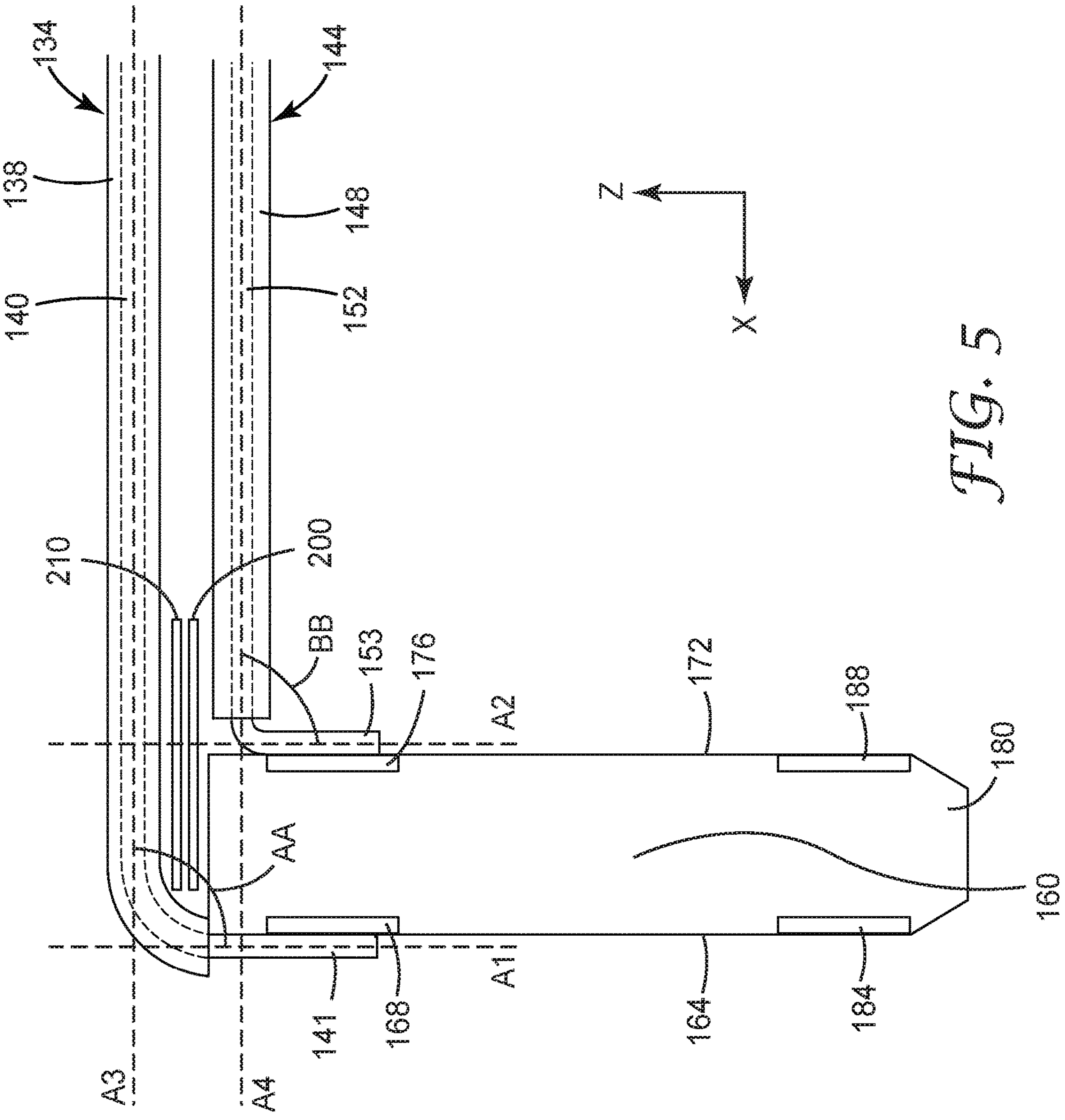
FIG. 5 is a side view of first and second cables, a PCB, and other features according to exemplary embodiments of the present disclosure.

FIG. 4 is a side view of a cable assembly, shown with internal features, and FIG. 5 is a side view of first and second cables, a PCB, and other features according to exemplary embodiments of the present disclosure. The PCB 160 can define a mating portion 180, a PCB first side 164, and a PCB second side 172. The PCB 160 can have a thickness of 1.57, or about 1.57, mm. The first side 164 and second side 172 can be substantially opposed from one another on the PCB 160. The mating portion 180 can be at least partially inserted into the mating connector 104 when the mating connector 104 is releasably secured to the cable assembly 130. A PCB first cable pad 168 and a first mating pad 184 can be disposed on the PCB 160 or the PCB first side 164. A PCB second cable pad 176 and a second mating pad 188 can be disposed on the PCB 160 or the PCB second side 172. The PCB first cable pad 168 can be in electrical communication with the first mating pad 184 and the PCB second cable pad 176 can be in electrical communication with the second mating pad 188.

One or more of the first cables 134 can include a first insulator 138 and a first conductor 140. One or more of the second cables 144 can include a second insulator 148 and a second conductor 152. One or both of the first conductor 140 and the second conductor 152 can be include an electrically conductive material such as a metal, metal alloy, aluminum, gold, silver, copper, or any other suitable material commonly known to those skilled in the art. The first insulator 138 can, fully or partially, surround the first conductor 140 and the second insulator 148 can, fully or partially, surround the second conductor 152. One or both of the first insulator 138 and the second insulator 148 can include an electrically insulating, or partially electrically insulating, material such as a polymer, rubber, plastic, organic material, carbon, non-metal, metal, or any other suitable insulating material known to those skilled in the art.

A first conductor exposed portion 141 can be a portion of the first conductor 140 that is either partially surrounded by the first insulator 138 or is not surrounded by the first insulator 138. The first conductor exposed portion 141 can be disposed at a forward (as measured along the X axis) portion of the first cable 134, and/or first conductor 140, and further can be in electrical communication with, in contact with, and/or proximate the PCB first cable pad 168. As can be exemplarily seen in FIGS. 4 and 5, axis A3 can be parallel with, or co-axial with, a portion of the first cable 134 where the first conductor 140 is partially or fully surrounded by the first insulator 138 and axis A1 can be parallel with, or co-axial with, a portion of the first conductor exposed portion 141. An angle AA can be defined between A3 and A1. In various embodiments, angle AA can be an angle of, about, at most, or at least: 0, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, or 180 degrees.

It can also be seen exemplarily in FIGS. 4 and 5 that, as portions of the first cable 134 change direction/orientation from axis A3 to axis A1 (by angle AA), both the first insulator 138 and the first conductor 140 also bend by angle AA. However, in various embodiments, despite a given angle AA, the first insulator 138 may or may not bend along with the first conductor 140. In FIGS. 4 and 5, the first insulator 138 is shown as bending by the full amount of the exemplary angle AA, or by about 90 degrees. However, in various embodiments, the first insulator 138 can bend by an angular amount at or below angle AA, or by an angle of, about, at most, or at least: 0, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, or 180 degrees. In some embodiments, portions of the first cable 134 (such as the first insulator 138, first conductor 140, and first conductor exposed portion 141) bend or change direction/orientation from axis A3 to axis A1 (by angle AA) proximate the PCB first cable pad 168.

A second conductor exposed portion 153 can be a portion of the second conductor 152 that is either partially surrounded by the second insulator 148 or not surrounded by the second insulator 148. The second conductor exposed portion 153 can be disposed at a forward (as measured along the X axis) portion of the second cable 144, and/or second conductor 152, and further can be in electrical communication with, in contact with, and/or proximate the PCB second cable pad 176. As can be exemplarily seen in FIGS. 4 and 5, axis A4 can be parallel with, or co-axial with, a portion of the second cable 144 where the second conductor 152 is partially or fully surrounded by the second insulator 148 and axis A2 can be parallel with, or co-axial with, a portion of the second conductor exposed portion 153. An angle BB can be defined between A4 and A2. In various embodiments, angle BB can be an angle of, about, at most, or at least: 0, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, or 180 degrees.

It can also be seen exemplarily in FIGS. 4 and 5 that, as portions of the second cable 144 change direction/orientation from axis A4 to axis A2 (by angle BB), the second insulator 148 does not bend by angle BB. However, in various embodiments, despite a given angle BB, the second insulator 148 may or may not bend along with the second conductor 152. In FIGS. 4 and 5, the second insulator 148 is shown as not bending by the full amount of the exemplary angle BB, or by about 90 degrees. Instead, the second insulator 148 is shown as not bending at all. However, in various embodiments, the second insulator 148 can bend by an angular amount at or below angle BB, or by an angle of, about, at most, or at least: 0, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, or 180 degrees. In some embodiments, the portions of the second cable 144 (such as the second insulator 148, second conductor 152, and second conductor exposed portion 153) bend or change direction/orientation from axis A4 to axis A2 (by angle BB) proximate the PCB second cable pad 176.

In some embodiments, the second insulator 148 bends or changes direction/orientation proximate the PCB second cable pad 176 less than the first insulator 138 bends or changes direction/orientation proximate the PCB first cable pad 168. In some embodiments, the second insulator 148 bends or changes direction/orientation less than the first insulator 138 bends or changes direction/orientation. In various embodiments, the second insulator 148 does not bend or change direction/orientation proximate the PCB second cable pad 176 while the first insulator 138 bends or changes direction/orientation proximate the PCB first cable pad 168. In various embodiments, the second insulator 148 bends or changes direction/orientation proximate the PCB second cable pad 176 less than the first insulator 138 bends or changes direction/orientation proximate the PCB first cable pad 168 by an angular amount of, about, at most, or at least: 0, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, or 180 degrees. In various embodiments, the second insulator 148 bends or changes direction/orientation less than the first insulator 138 bends or changes direction/orientation by an angular amount of, about, at most, or at least: 0, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, or 180 degrees.

In some embodiments, the cable assembly 130 can include an insulating layer 200, or an electrical insulation layer, and a shield layer 210, or an electrical shield layer. The insulating layer 200 can include any electrical insulating material known to those skilled in the art, such as polymers, polyester, biaxially-oriented polyethylene terephthalate, Mylar, rubbers, ceramics, organic materials, or carbon. The shield layer 210 can include any electrically-conductive material known to those skilled in the art, such as (but not limited to) metals, metal alloys, copper, aluminum, gold, and silver. The shield layer 210 can be folded around lateral (spaced apart along the Y axis) sides of the cable assembly 130, first cables 134, and/or second cables 144, and further the shield layer 210 can be grounded (or connected to ground).

The insulating layer 200 can be disposed above the second cables 144, below the shield layer 210, and/or below the first cables 134 as measured along the Z axis. The shield layer 210 can be disposed above the second cables 144, above the insulating layer 200, and/or below the first cables 134 as measured along the Z axis. In various embodiments, the second cables 144 can be adjacent, contacting, not in contact with, adhered to, and/or joined to the insulating layer 200. In various embodiments, the shield layer 210 can be adjacent, not in contact with, contacting, adhered to, and/or joined to the insulating layer 200. In various embodiments, the shield layer 210 can be adjacent, not in contact with, contacting, adhered to, and/or joined to the first cables 134.

In various embodiments, one or both of the insulating layer 200 and the shield layer 210 are disposed above, as measured along the Z axis, at least a portion of the second conductor exposed portion 153, the PCB second cable pad 176, the PCB 160, the first conductor exposed portion 141, and/or the PCB second cable pad 176. In various embodiments, at least a portion of one or both of the insulating layer 200 and the shield layer 210 are disposed forward of, as measured along the X axis, at least a portion of the second conductor exposed portion 153, the PCB second cable pad 176, the PCB 160, the first conductor exposed portion 141, and/or the PCB second cable pad 176. In various embodiments, at least a portion of one or both of the insulating layer 200 and the shield layer 210 are disposed rearward of, as measured along the X axis, at least a portion of the second conductor exposed portion 153, the PCB second cable pad 176, the PCB 160, the first conductor exposed portion 141, and/or the PCB second cable pad 176. Additionally, in various embodiments, one or more of the second conductor exposed portion 153, the PCB second cable pad 176, the PCB 160, the first conductor exposed portion 141, and the PCB second cable pad 176 are disposed within the overmold 230.

The disclosed embodiments provide numerous benefits over current technologies. The particular bending and connection arrangements disclosed of the first cable 134, first insulator 138, first conductor 140, first conductor exposed portion 141, second insulator 148, second conductor 152, second conductor exposed portion 153, and/or second cable 144 enable a low height H (as can be seen in FIG. 3) as measured along the Z axis between a top surface of the cable assembly 130 and the board 110 (which can also be called a motherboard) when the cable assembly 130 is releasably connected to the mating connector 104. This lower height H, which in various embodiments, can be 11.3 mm or 11.7 mm, or can be below 12 mm or below 15 mm, allows the cable assembly 130 to be used in a greater range of tight spaces, such as those surrounding boards or in server facilities.

Additionally, the shield layer 210 and insulating layer 200, and the relative positions therebetween and with respect to other elements of the cable assembly 130, facilitate the particular embodiments of the first conductor exposed portion 141 and the second conductor exposed portion 153 by reducing cross-talk and introducing grounding and insulation elements therebetween. Additionally, the use of varying degrees of bending among the first cable 134, first insulator 138, first conductor 140, first conductor exposed portion 141, second insulator 148, second conductor 152, second conductor exposed portion 153, and/or second cable 144 allows greater freedom to select particular materials optimized for each degree of bending. Also, the disclosed embodiments provide for particular arrangements of the first cable 134, first insulator 138, first conductor 140, first conductor exposed portion 141, second insulator 148, second conductor 152, second conductor exposed portion 153, and/or second cable 144 being housed within the overmold 230, thus providing enhanced structural rigidity to the cable assembly 130 and also adding additional protection against dust, water, radiation, and physical damage.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present disclosure. Thus, it should be understood that although the present disclosure has been specifically disclosed by specific embodiments and optional features, modification and variation of the concepts herein disclosed may be resorted to by those of ordinary skill in the art, and that such modifications and variations are considered to be within the scope of embodiments of the present disclosure. The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control.

What is claimed is:

1. A cable assembly, comprising:

a first cable including a first conductor and a first insulator;

a second cable including a second conductor and a second insulator;

a printed circuit board (PCB);

a PCB first cable pad disposed on the PCB, the first conductor being in electrical communication with the PCB first cable pad;

a PCB second cable pad disposed on the PCB, the second conductor being in electrical communication with the PCB second cable pad; and an electrical insulation layer comprising mylar disposed between the first cable and the second cable; and an electrically conductive shield disposed between the first cable and the second cable;

wherein the first conductor and first insulator each bend at least 30 degrees proximate the PCB first cable pad, the second conductor bends at least 30 degrees proximate the PCB second cable pad, and the second insulator bends proximate the PCB second cable pad less than the second conductor does proximate the PCB second cable pad.

2. The cable assembly of claim 1, wherein the PCB first cable pad and the PCB second cable pad are disposed on opposite sides of the PCB.

3. The cable assembly of claim 1, wherein the second insulator does not bend proximate the PCB second cable pad.

4. The cable assembly of claim 1, wherein the bent portions of the first insulator and second insulator are disposed within a housing.

5. The cable assembly of claim 1, wherein the first conductor and first insulator each bend at least 45 degrees proximate the PCB first cable pad.

6. The cable assembly of claim 1, wherein the first conductor and first insulator each bend at least 90 degrees proximate the PCB first cable pad.

7. The cable assembly of claim 1, wherein the second conductor bends at least 45 degrees proximate the PCB second cable pad.

8. The cable assembly of claim 1, wherein the second conductor bends at least 90 degrees proximate the PCB second cable pad.

9. A cable assembly, comprising:

a first cable including a first conductor and a first insulator;

a second cable including a second conductor and a second insulator;

a printed circuit board (PCB);

a PCB first cable pad disposed on the PCB, the first conductor being in electrical communication with the PCB first cable pad; and a PCB second cable pad disposed on the PCB, the second conductor being in electrical communication with the PCB second cable pad;

an electrical insulation layer comprising mylar disposed between the first cable and the second cable; and an electrically conductive shield disposed between the first cable and the second cable.

10. The cable assembly of claim 9, wherein the electrically conductive shield includes copper.

11. The cable assembly of claim 9, wherein a portion of the first conductor is not surrounded by the first insulator, and the electrical insulation layer is disposed between the second cable and the portion of the first conductor not surrounded by the first insulator.

12. The cable assembly of claim 9, wherein a portion of the first conductor is not surrounded by the first insulator, and the electrically conductive shield is disposed between the second cable and the portion of the first conductor not surrounded by the first insulator.

13. The cable assembly of claim 9, wherein the electrical insulation layer is disposed below the electrically conductive shield, as measured along a Z axis.

14. The cable assembly of claim 9, wherein the electrically conductive shield is disposed closer to the first cable than is the electrical insulation layer.

15. The cable assembly of claim 9, wherein the electrical insulation layer is disposed closer to the second cable than is the electrically conductive shield.

16. The cable assembly of claim 9, wherein the electrically conductive shield is in physical contact with the first cable.

17. The cable assembly of claim 9, wherein the electrical insulation layer is in physical contact with the second cable.

18. The cable assembly of claim 9, wherein the electrically conductive shield is in physical contact with the electrical insulation layer.

19. The cable assembly of claim 9, wherein bent portions of the first insulator and second insulator are disposed within a housing.

* * * * *